United States Patent [19]

Omori et al.

[11] 3,797,077

[45] Mar. 19, 1974

[54] METAL CLAMP BAND

[75] Inventors: Kunihide Omori, Kuwana; Hiromi Nagayoshi, Chino, both of Japan

[73] Assignee: Toyo Bearing Manufacturing Company Limited, Osaka-shi, Japan

[22] Filed: Oct. 24, 1972

[21] Appl. No.: 300,391

[30] Foreign Application Priority Data

Oct. 27, 1971 Japan............................46-85728

[52] U.S. Cl. .................................................. 24/273
[51] Int. Cl. ........................................... B65d 63/02
[58] Field of Search ........... 24/16, 19, 20 TT, 71 A, 24/71 ST, 71 T, 68 E, 68 BT, 68 T, 68 F, 270, 271, 272, 273

[56] References Cited

UNITED STATES PATENTS

| | | | |
|---|---|---|---|
| 2,654,926 | 10/1953 | Delafosse | 24/16 R |
| 2,663,923 | 12/1953 | Mattingly | 24/273 |
| 2,841,855 | 7/1958 | Weber | 24/273 |
| 3,276,089 | 10/1966 | Cheever et al. | 24/270 |

FOREIGN PATENTS OR APPLICATIONS

| | | | |
|---|---|---|---|
| 819,481 | 10/1951 | Germany | 24/273 |

*Primary Examiner*—Donald A. Griffin
*Attorney, Agent, or Firm*—Hall & Houghton

[57] ABSTRACT

Clamp band for hose, dust cover of universal joint and the like provided with a lever secured thereto to exert a powerful tightening force through a lever-action so that said band is securely locked against expansion. Collar means may maintain the locked condition.

2 Claims, 4 Drawing Figures

METAL CLAMP BAND

BACKGROUND OF THE INVENTION a. Field of the Invention

The present invention relates to a metal clamp band applied to clamp hose, dust cover of universal joint and the like which are generally produced in large quantities.

b. Description of the Prior Arts

One of the prior art device for the same purpose is a thread-clamping means comprising bolt and nut, and the other is a method wherein a pliable steel band is wound around the hose or the like to form a two or three-ply ring with a collar mounted therearound and then is secured by means of a punch forced through inwardly from the outer wall of the collar, the free end of said band then being borken off at the adjacent edge of the collar.

Although those prior arts have an advantage capable of adjusting the tightening force, they respectively are not free from the disadvantages as following, when applied to a large quantities of objects of same diameter.

In the thread-clamping means, exposure of cumbersome or dangerous projection is found unavoidable, while, in the latter method, the aforementioned punching must be carried out by exerting a powerful pull on the outer end of the band with the inner end thereof tightly wound on the hose, thus necessitating not only a use of an exclusive tool but also breaking off of the extention of the band.

SUMMARY OF THE INVENTION

Destined to avoid the aforementioned disadvantages experienced on the conventional clamp bands, the present invention provides a clamp band capable of a constant and powerful clamp without applying such components as bolt and nut to eliminate any cumbersome projections as well as to give a smart appearance, thus representing very substantial ease and economy of manufacture.

Figure 1:
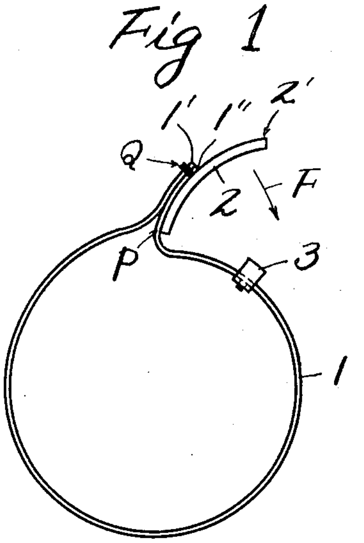
FIG. 1 is a front view of a metal clamp band according to the invention before it is clamped and the numerals respectively indicate: (1)... a metal band element, e.g., a steel tape, (2)... a lever, (3)... a collar or a sleeve.

Metal band 1 is wound to shape a ring with its both outwardly extending ends 1', 1'' put together which are then integrally connected together with lever 2 preferably made of a steel band thicker than said metal tape 1 at one of the outer surface of lever 2 in the shape of a circular arc and preferably made of a steel band thicker than the said tape 1 by means of spot-welding, rivetting or any other suitable means.

To exert a clamp, lever 2 is brought down toward the direction of arrow F, whereby lever 2 is turned about fulcrum P, the innermost end thereof, to let the spot - welded point Q rotate to reduce the diameter of the ring exerting a powerful clamp thereby.

That is, the outer end of lever 2', P and Q respectively represent the application point, fulcrum and dynamic point with respect to the lever action of lever 2.

Therefore, the clamping force may be increased in proportion to an increase of the distance between points P and Q, and the longer the distance from Q to the outer end 2' of lever 2 is, the less may be the handling power, which length being properly adjustable in practice according to the requirement.

As shown in the drawings, it is preferable that lever 2 be shaped so as to conform with the circumferential surface of the annular band 1.

The collar 3 consisting of a base wall with two side walls extending at right angles to the base, is for the purpose of fixedly securing a part of lever 2 adjacent to the outer end thereof 2' onto the annular band 1 after the aforesaid clamping, so that the band is held in well tensioned condition against any expansion, and is, in practice, fixedly applied by means of spot-welding or any other means beneath the band 1 with the side walls extending upwardly so that the band as well as the outer end portions 2' of lever 2 be placed between the side walls.

So, by forcibly bending the upper ends of said side walls inwardly, said outer ends 2' of lever 2 is integrally held onto the band 1.

Figure 3:
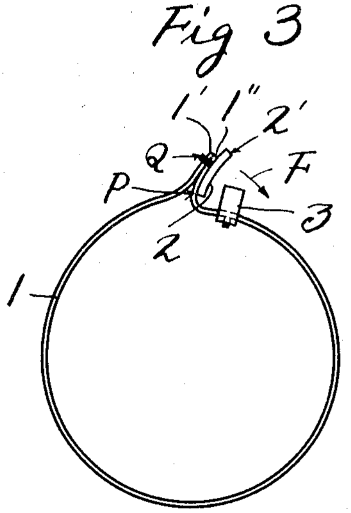
Figure 4:
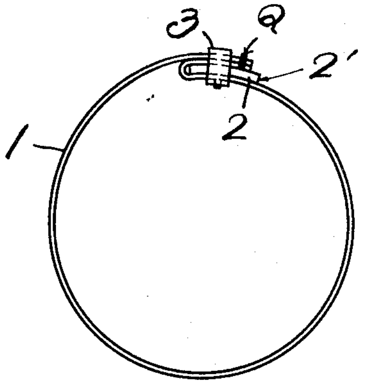

FIGS. 3 and 4 show another embodiment wherein the lever 2 is very shortened, and the both ends 1', 1'' of band 1 and the lever 2 are collectively and integrally held with the band 1 by collar 3.

In this manner of joint at a point adjacent to the inner end of lever 2, the clamping of metal clamp band is not disengaged in the event that the lever and the ends of metal band become disjointed.

Figure 2:
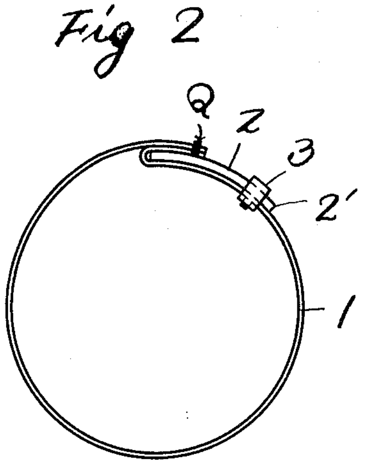
FIG. 2 is a front view of the metal clamp band of FIG. 1 in clamped condition.

In the first embodiment as shown in FIGS. 1 and 2, another collar to fixedly hold the inner end of lever together with the band so piled may be additionally adopted.

The inner diameter d of the annular metal band should naturally be set so as to be slightly smaller than the outer diameter of the section of the object on which it is to be applied.

Any suitable metallic materials other than steel tape may also be used for the described metal band.

The metal clamp band according to the present invention features in minimizing the labor for application thereof representing a significant economical advantage especially for the products generally produced in large quantities.

Further advantages thereof include, requirement of no special tools for the application, constant and stabilized joint, lower manufacturing cost owing to the very simple construction, powerful clamp, and elimination of cumbersome projection resulting in a smart appearance.

Consequently, those advantages of the invention will accrue an excellent effect when applied on not only hose and dust-cover of universal joint but also any other proper objects.

While there have been described herein what are at present considered preferred embodiments of the several features of the invention, it will be obvious to those skilled in the art that modification and changes may be made without departing from the essence of the invention. It is therefore to be understood that the examplary embodiments thereof are illustrutive and not restrictive of the invention, the scope of which is defined in the appended claims and that all modifications that come within the meaning and range of equivalency of the claims are intended to be included therein.

We claim:

1. A metal clamp band comprising a single ply annular metallic band having a circular configuration corresponding to the circular configuration of an article to be clamped, the free ends of said metallic band extending outwardly therefrom and in flush engagement with one another forming an upstanding engaged end portion, a lever element of a thickness greater than that of said metallic band fixedly secured at one end to said engaged end portion and extending outwardly therefrom in the same direction as said engaged end portion, said lever element when moved down to the surface of said metallic band causing said engaged end portion to bend downwardly thereby shortening the diameter of said band and imparting a strong clamping action thereto, and a collar fixedly secured to said band close to but spaced from the engaged end portion of said band to receive and retain in tight engagement at least the free end of said lever element when same is bent down against the band surface.

2. A metal clamp band in accordance with claim 1, wherein the lever element is of a length and the collar is so spaced on the band that when the lever element is bent down against the surface of the band, the collar will retain both the lever element and the engaged end portion in tight engagement.

* * * * *